(12) United States Patent
Melz et al.

(10) Patent No.: US 8,312,977 B2
(45) Date of Patent: Nov. 20, 2012

(54) APPARATUS FOR PRODUCING A FRICTIONAL AND/OR FORM-FITTING CONNECTION BETWEEN TWO COMPONENTS WHICH ARE ARRANGED SUCH THAT THEY CAN BE MOVED LINEARLY OR ROTATED RELATIVE TO ONE ANOTHER

(75) Inventors: Tobias Melz, Darmstadt (DE); Sven Herold, Gross-Umstadt (DE); Björn Seipel, Florstadt (DE); Joachim Bös, Darmstadt (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 660 days.

(21) Appl. No.: 12/094,428

(22) PCT Filed: Nov. 20, 2006

(86) PCT No.: PCT/EP2006/011107
§ 371 (c)(1),
(2), (4) Date: Sep. 16, 2009

(87) PCT Pub. No.: WO2007/057218
PCT Pub. Date: May 24, 2007

(65) Prior Publication Data
US 2010/0018823 A1 Jan. 28, 2010

(30) Foreign Application Priority Data
Nov. 21, 2005 (DE) .......................... 10 2005 055 759

(51) Int. Cl.
*F16D 27/00* (2006.01)
*F16D 13/18* (2006.01)
*F16D 65/14* (2006.01)
(52) U.S. Cl. ........ 192/75; 192/84.1; 192/82 T; 188/323; 188/330
(58) Field of Classification Search .................... 192/75; 188/330
See application file for complete search history.

(56) References Cited

U.S. PATENT DOCUMENTS 2,087,488 A * 7/1937 Stanley ........................... 192/31
(Continued)

FOREIGN PATENT DOCUMENTS

DE 1 683 329 9/1954
(Continued)

OTHER PUBLICATIONS

Handbuch Des Maschinenbaues, Fachbuchverlag Dr. Pfannenberg & Co., Gießen, 1951, S. 40,41.

*Primary Examiner* — Richard M. Lorence
(74) *Attorney, Agent, or Firm* — Antonelli, Terry, Stout & Kraus, LLP.

(57) ABSTRACT

An apparatus is disclosed for producing a frictional and/or form-fitting connection between first and second components which are linearly or rotationally movable relative to one another for transmitting forces and/or force moments that act between the first and second components in a linear and/or rotational manner. The first component surrounds the second component, at least sectionally, with at least one inner wall that faces the second component. The second component features at least one active-face element that can be transferred in a force-loaded manner from a first position, in which the active-face element is spaced apart from the inner wall, into a second position, in which the active-face element produces the frictional and/or form-fitting connection with the inner wall. The invention includes at least one mechanical stressing element for exerting a restoring force upon the active-face element which holds the active-face element in a first position, and a kinematic system acts upon the active-face element opposite to the restoring force and is driven exclusively by a converter material, with the kinematic system transferring the active-face element into the second position.

12 Claims, 5 Drawing Sheets

U.S. PATENT DOCUMENTS

| | | | |
|---|---|---|---|
| 2,407,035 A * | 9/1946 | Rossell | 188/78 |
| 4,550,695 A | 11/1985 | Kikuchi et al. | |
| 4,602,702 A | 7/1986 | Ohta et al. | |
| 5,826,683 A | 10/1998 | Murata et al. | |
| 6,167,997 B1 | 1/2001 | Keeney | |
| 6,902,048 B1 | 6/2005 | Chung | |
| 7,395,903 B2 * | 7/2008 | Takahashi et al. | 188/72.1 |

FOREIGN PATENT DOCUMENTS

| | | |
|---|---|---|
| DE | 39 21 975 A1 | 3/1990 |
| DE | 196 24 527 A1 | 1/1997 |
| DE | 299 10 187 U1 | 9/1999 |
| DE | 198 51 251 C2 | 5/2000 |
| DE | 102 13 915 A1 | 10/2003 |
| DE | 10 2004 027 375 A1 | 1/2005 |
| GB | 214564 | 4/1924 |
| GB | 2 010 396 A | 7/1979 |
| JP | 58-211027 | 12/1983 |
| JP | 60-21126 | 10/1985 |
| JP | 61-99724 | 5/1986 |
| JP | 62-147130 | 7/1987 |
| JP | 2005113995 A | 4/2005 |
| WO | WO 2005/005828 A2 | 1/2005 |

* cited by examiner

APPARATUS FOR PRODUCING A FRICTIONAL AND/OR FORM-FITTING CONNECTION BETWEEN TWO COMPONENTS WHICH ARE ARRANGED SUCH THAT THEY CAN BE MOVED LINEARLY OR ROTATED RELATIVE TO ONE ANOTHER

BACKGROUND OF THE INVENTION

1. Field of the Invention

The invention pertains to an apparatus for producing a frictional and/or form-fitting connection between two components that are arranged such that they can be moved linearly or rotated relative to one another for the purpose of transmitting forces and/or force moments that act between the two components in a linear and/or rotational manner, wherein the first component surrounds the second component at least sectionally with at least one inner wall that faces the second component, and wherein the second component features at least one active-face element that can be transferred in a force-loaded manner from a first position, in which the active-face element is spaced apart from the inner wall, into a second position, in which the active-face element produces the frictional and/or form-fitting connection with the inner wall. An apparatus of this type is preferably used as a brake or a clutch.

As a supplement, an alternative apparatus is described that is comparable to the aforementioned apparatus and comprises two components that are arranged such that they can be independently rotated about a common rotational axis and functionally connected for the purpose of transmitting forces and/ or force moments that act between the two components in a rotational manner, wherein the first component features at least one active face that is inclined relative to the rotational axis or orthogonally intersects the rotational axis, and wherein the second component features at least one active face such that a face contact between the two active faces, which results in a frictional and/or form-fitting connection between the two components, can be produced by means of an axial excursion of at least one of the two active faces. An apparatus of this type is used as a clutch element, by means of which both components can be transferred from a state of independent rotation into a state of synchronous rotation.

2. Description of the Prior Art

Apparatuses of the above-described type primarily serve for the controlled transmission of forces between two components that are usually arranged such that they can be rotated relative to one another about a common rotational axis, wherein one component is connected to a drive element and the other component is connected to a driven element. Depending on the respective technical application, the components that are functionally connected to one another in the form of a frictional and/or form-fitting connection may either serve for exerting a braking effect upon a component that serves as the drive element by the other component that serves as the driven element or, if realized in the form of a clutch, for transferring the components that respectively rotate about a common rotational axis independently of one another into a state of synchronous rotation.

One classic example for the realization in the form of a brake is the conventional drum brake, in which two shaped brake shoes are provided that can be respectively pivoted about a pivoting axis on a rigid end support, wherein the radially outer contour of said brake shoes can be respectively inscribed in a circle, and wherein the brake shoes are pivoted radially outward about the pivoting axis under the influence of an actuator such that they are pressed against the inner side of a drum-shaped housing that is connected, for example, to a wheel to be decelerated in a rotationally rigid fashion. The actuator is usually realized in the form of a hydraulic cylinder, the actuation of which causes the shaped brake shoes to be spread radially outward. After the actuation of the brake cylinders, the brake shoes are returned radially inward, that is, into a state in which they are spaced apart from the drum housing, by means of a pull-back spring.

In order to initiate a braking maneuver, it is typically required to actuate a master cylinder that is able to spread the brake shoes provided in the drum brake against the respective inner side of the drum housing in a force-loaded manner by means of a corresponding hydraulic transmission of forces.

In numerous technical applications, it is desirable to carry out certain mechanical coupling or braking maneuvers in a controlled fashion depending on, for example, the temperature and/or other external energy states. The activation of such braking or coupling maneuvers usually requires the supply of external energy, for example, in the form of mechanical energy such as, for example, the above-described actuation of a control or brake lever or in the form of electric energy such as, for example, an electric excitation of a coil such that the complexity of the braking or coupling apparatus is ultimately increased.

U.S. Pat. No. 4,550,695 describes a fan arrangement, the motor-driven fan wheel of which is held in a decelerated position by a spring brake. One side of the spring brake is rigidly connected to a stationary housing and the other side presses against a brake rotor that is connected to the fan wheel in a rotationally rigid fashion by means of a brake element that is subjected to a spring force. As long as a certain limit temperature is not exceeded, the fan wheel is stopped due to the intimate contact between the brake element and the brake rotor. Once a certain limit temperature is exceeded, the spring force is lowered such that the brake element is transferred into a position, in which it is spaced apart from the brake rotor and the fan wheel is released such that it is able to rotate freely. The spring element that is functionally connected to the brake element consists of a shape memory alloy that assumes an elongated state at low temperatures and a shortened state at temperatures above a certain limit temperature. The braking apparatus described in the aforementioned publication therefore is autonomously activated by the ambient temperature.

JP 62147130 A describes an overload clutch that is designed like a drum brake and features inner brake shoe members within a drum housing, wherein the brake shoe members are subjected to a centrifugal force resulting from the rotational movement and radially pressed against the inner wall of the drum housing by this centrifugal force. The brake shoes are also functionally connected to a spring that consists of a shape memory alloy and is shortened in case of thermal overheating due to increased brake friction such that the spring pulls the brake shoe members radially inward and the braking effect diminishes in order to ultimately prevent thermal overheating of the apparatus that acts as a clutch.

JP 61099724 A describes a clutch arranged between a drive segment and a driven segment, wherein a coil spring is extended and relaxed by a spring consisting of shape memory material such that the drive shaft and the driven shaft are respectively engaged and disengaged. The spring consisting of shape memory material is subjected to an electric control current in order to actuate the clutch.

Japanese publication JP 58211027 A also describes a mechanism that increases the braking force between two rotating bodies and, analogous to the initially cited design of a drum brake, features two shaped brake shoes that are respectively adapted to the inner contour of the drum housing and can be pivoted radially outward against the wall of the drum housing about a common rotational axis. The excursion of the brake shoes about the rotational axis is realized with the aid of an externally actuated hydraulic cylinder that makes it possible to bring the brake shoes into intimate frictional contact with the inner wall of the drum housing. The rotation of the inner wall of the drum relative to the brake shoes generates frictional heat that is able to spread a functional element that consists of shape memory metal and is also connected to the brake shoes such that the braking force between the brake shoes and the inner wall of the drum housing is increased.

SUMMARY OF THE INVENTION

The invention is an apparatus of the initially described type for producing a frictional and/or form-fitting connection between two components that are arranged such that they can be moved linearly or rotated relative to one another in such a way that the transmission of rotationally or linearly accelerating or decelerating forces or force moments between a rotatable or linearly movable component relative to a second component can be realized with the simplest construction possible, wherein the engaging or coupling process, during which both components are respectively engaged or functionally connected to one another, takes place automatically, that is, without controlling an external energy supply. The activation of the engaging or coupling process should rather be initiated automatically in dependence on an energy state that is adjusted in an uncontrolled or unregulated fashion such as, for example, the ambient temperature. In addition, it should not only be possible to realize the activation in dependence on thermal energy, but also in dependence on other types of energy such as, for example, magnetic or electrodynamic energy.

The invention is an apparatus for producing a frictional and/or form-fitting connection between two components that are arranged such that they can be moved linearly or rotated relative to one another for the purpose of transmitting forces and/or force moments that act between the two components in a linear and/or rotational manner, wherein the first component surrounds the second component at least sectionally with at least one inner wall that faces the second component, and wherein the second component features at least one active-face element that can be transferred in a force-loaded manner from a first position, in which the active-face element is spaced apart from the inner wall, into a second position, in which the active-face element produces the frictional and/or form-fitting connection with the inner wall, with the apparatus being realized in such a way that at least one mechanical stressing element is provided that exerts a restoring force upon the active-face element and this restoring force holds the active-face element in a first position. In addition, a kinematic system is provided that acts upon the active-face element opposite to the restoring force and is driven exclusively by a converter material, wherein the kinematic system transfers the active-face element into the second position.

According to the invention, the kinematic system, driven by a converter material, initiates a coupling or braking process between both components, as well as the at least one mechanical stressing element for kinematically decoupling the two components from one another, is directly connected to the second component or forms part of the second component such that, if the first component is a drum housing, the at least one stressing element, as well as the kinematic system, preferably can be peripherally surrounded by the drum housing in its entirety in order to create a completely encapsulated unit without any external connection. Depending on the material class selection with respect to the converter material that drives the kinematic system, it needs to be ensured that the energy form that activates the converter material is also able to act within the space encapsulated by the first component, in which the converter material and the stressing element are situated. In addition to the basic usability of piezoelectric materials, electrorestrictive materials and magnetostrictive materials are possible converter materials. Also, a shape memory alloy (SMA) that is subjected to a predetermined shape change as the temperature changes is also particularly suitable for this purpose. Shape memory alloys in the form of wires or strips are typically reduced in length when an activation temperature that depends on the particular alloy is exceeded, wherein length reduction causes the excursion of the active-face elements into the above-described second position due to the corresponding design of the kinematic system. Consequently, it needs to be ensured that the converter material is thermally coupled to the ambient temperature. Corresponding precautions need to be taken if the converter material consists, for example, of a magnetostrictive material that undergoes a shape change due to a variation of the magnetic field surrounding the converter material.

The inventive apparatus serves as a clutch or a brake depending on whether both components can be rotated about a common rotational axis independently of one another or one of the two components is arranged stationarily in space. In both instances, a corresponding excursion of the at least one active-face element against the inner wall of the first component results in forces that act radially referred to the rotational axis and cause the coupling or braking process between both components. As an alternative to such an apparatus, it is also possible realize another brake or clutch apparatus that operates in an entirely autonomous or free fashion and comprises two components that are arranged such that they can be independently rotated about a common rotational axis, wherein the first component features at least one active face that is inclined relative to the rotational axis or orthogonally intersects the rotational axis, and wherein the second component features at least one active face such that a face contact between the two active faces, which results in a frictional and/or form-fitting connection between the two components, can be produced by means of an axial excursion of at least one of the two active faces. The forces and/or force moments acting between both components are directed axially referred to the rotational axis in this variation. In the case, a converter material for generating a first axially directed force, as well as a spring-like element for generating a second directional force that is directed axially opposite to the first force, is also provided on one of the two components. The converter material and the spring-like element are placed between two parts of the one component that can be axially moved relative to one another and are connected in a rotationally rigid fashion such that they are able to axially move both parts in dependence on the shape change of the converter material used. Since the second variation features two components that are arranged such that they can be rotated along a common rotational axis independently of one another, this variation serves exclusively as a clutch element and, analogous to the first alternative, is advantageously an extremely compact and robust construction that is furthermore able to operate without any externally regulated or controlled energy supply. However, this apparatus may also serve as a brake if one component is coupled stationarily in space.

As initially mentioned, the inventive apparatus may, depending on the respective design, serve as a brake or a clutch between two rotating shafts, one of which represents, for example, a drive shaft and the other one of which represents a driven shaft. The inventive apparatus is particularly suitable for kinematically coupling a fan propeller to a shaft that is driven by an electric motor. In this case, the objective is operating a fan propeller that usually is rigidly connected to such a shaft and always rotates synchronous with the shaft speed due to the rigid connection to the shaft in such a way that the fan propeller only rotates synchronously with the shaft if a cooling effect to be realized with the fan propeller is desired due to the current heat state. Under normal operating conditions, such a cooling effect is only realized at extreme ambient temperatures and a correspondingly extreme load of the electric motor such that the fan propeller can be mostly switched off, for example, in order to reduce the noise. The inventive clutch apparatus makes it possible, for example, to only drive the fan propeller that is rigidly connected to the first component by the drive shaft connected to the second component if an ambient temperature that causes the initial deformation of the converter material is exceeded. If the ambient temperature remains below the corresponding limit temperature, no accelerating forces of the drive shaft whatsoever are transmitted between the second and the first component.

Based on the functional principles for coupling two components that can be rotated relative to one another or two components that can be moved linearly to one another which were generally described above, it is possible to realize several concrete embodiments, based on which the general principle of the invention is described in greater detail below.

BRIEF DESCRIPTION OF THE DRAWINGS

Embodiments of the invention are described in an exemplary fashion below with reference to the figures without restricting the general object of the invention. The figures show.

DETAILED DESCRIPTION OF THE INVENTION

Figure 1:
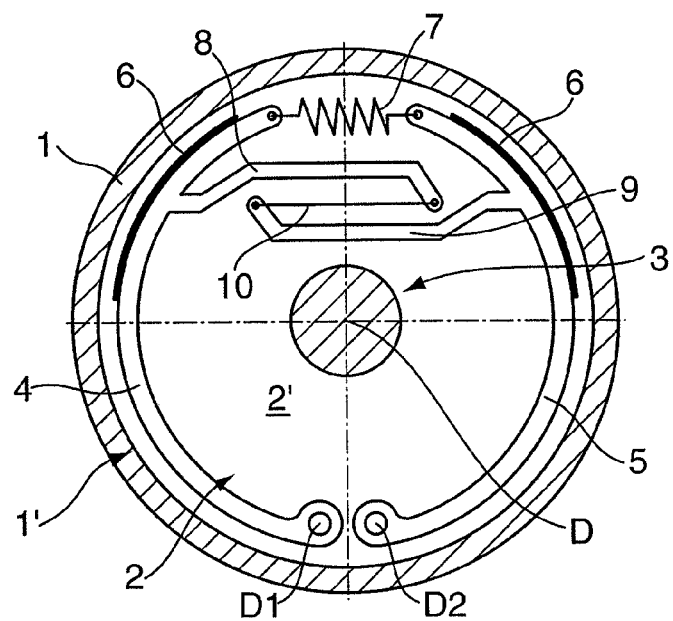
FIGS. 1 to 4 illustrate alternative embodiments of clutch or brake apparatuses that are based on forces or force moments that act radially referred to a rotational axis.

FIG. 1 shows a first embodiment of an inventive apparatus that makes it possible to transmit rotational forces or force moments between two components 1 and 2 that are arranged such that they can be rotated about a rotational axis D. It is assumed that the second component 2 is arranged on a drive shaft 3 in a rotationally rigid fashion while the first component 1 is a hollow-cylindrical component or a drum housing and connected to a driven element which is not illustrated. The second component 2 that is connected to the shaft 3 features a disk-shaped carrier plate 2', wherein two sickle-shaped or arc-shaped active-face elements 4 and 5 are coupled to the upper side of the carrier plate that faces the observer in FIG. 1 such that they can be respectively pivoted about a pivoting axis D1 and D2. On the side that radially faces away from the shaft 3, the active-face elements 4 and 5 have a surface contour that is largely adapted to the inner wall 1' of the first component 1 which is a hollow-cylindrical drum housing in a form-fitting fashion. A friction lining 6 is provided at least in a selected region of the surface of the respective active-face element 4 and 5 that faces the inner wall 1' of the drum housing, wherein the friction lining makes it possible to generate higher frictional forces between the respective active-face elements 4 and 5 and the inner wall 1' of the first component 1 that is realized with a drum housing.

The ends of the active-face elements 4 and 5 that lie opposite of the pivoting axes D1 and D2, are connected to one another by a mechanical stressing element 7 which is a conventional tension spring in the embodiment according to FIG. 1 such that the stressing element 7 holds both active-face elements together as shown in FIG. 1 if no other forces act upon the active-face elements 4 and 5 and the surfaces of the active-face elements 4 and 5 that face the inner wall of the first component 1 and, in particular, the friction linings 6 are radially spaced apart from the inner wall of the first component 1. In addition, web-like extensions 8 and 9 are arranged on both active-face elements 4 and 5 in the manner shown in FIG. 1, wherein these web-like extensions respectively extend in the direction of the opposite active-face element and both web-like extensions 8 and 9 overlap one another at least sectionally. A wire-shaped or strip-shaped converter material, preferably in the form of a SMA wire, that is, a wire made of a shape memory material or shape memory alloy, which extends between the two web-like extensions 8 and 9, wherein the converter material is subjected to such a shape change under the influence of energy in the form of heat that it contracts in the longitudinal direction under an elevated temperature. This generates a force that is directed opposite to the prevailing restoring force exerted by the stressing element 7 and spreads both active-face elements 4 and 5 radially outward such that the friction linings 6 of the active-face elements 4, 5 are pressed into frictional engagement with the inner wall 1' of the first component 1 which is a drum housing. Depending on whether the first component 1 that is connected to the driven element is also able to rotate about the rotational axis D or arranged stationarily, the prevailing rotational movement caused by the drive shaft 3 can be transmitted to the first component 1 or decelerated accordingly by means of the second component 2. However, once the temperature drops below a certain temperature value, the SMA wire relaxes again and the stressing element 7 which is a conventional tension spring or coil spring, pulls the active-face elements 4 and 5, which act as brake shoes, together such that the frictional connection is disengaged. The tension spring or coil spring used as the stressing element 7 needs to have a spring stiffness such that it not only holds together the active-face elements 4 and 5 against the centrifugal forces acting thereupon, namely even at the highest occurring rotational speeds of the second component about the rotational axis D, but can also be extended by the SMA wire 10 and the outwardly directed force that is generated when this wire is heated and radially acts upon the active-face elements 4 and 5.

According to the embodiment shown in FIG. 1, only the stressing element 7 that is functionally connected to the active-face elements 4 and 5 and the wire-shaped or strip-shaped converter material 10 are required for producing and for disengaging the frictional connection between the first and the second component. This means that no other regulated or controlled external energy supply is required for producing and disengaging the frictional connection and/or form-fitting connection between the two components 1 and 2. The frictional and/or form-fitting connection is simply produced and disengaged by utilizing the energy state that is able to cause a corresponding shape change in the converter material 10. Depending on the selection of the converter material, the function of the inventive apparatus may depend on a prevailing external energy field. If the converter material is a temperature-sensitive material as described above, for example, a shape memory alloy, the shape of the converter material is usually reduced in size or shortened beginning at a certain limit temperature, wherein the converter material is reversibly returned to its original shape by means of an external force or spring force when the temperature drops below the limit temperature.

However, it is also possible to utilize converter materials such as, for example, magnetostrictive materials that are subjected to a shape change when the intensity of the surrounding magnetic field changes. Other converter materials such as, for example, piezoelectric or electrorestrictive materials are able to perform shape changes that can be initiated by applying an electric voltage or an electrostatic field.

The compactness and, in particular, the mechanical encapsulation of the system for realizing a braking effect and for terminating a braking effect achieved due to a free engaging principle is illustrated in the embodiment according to FIG. 1. If the first component is a drum housing with at least one open drum housing side for installing the active-face elements 4 and 5 connected to the second component such that a closed, encapsulated brake or clutch element to be implemented between a drive train and a driven train can be realized, rotationally acting forces or force moments can be transmitted between both components in dependence on a prevailing external energy field if the drive element and the driven element are rotating elements.

It is also possible to transmit linear forces between the two components if the first component can be longitudinally displaced relative to the second component along the linear axis that is identified as the rotational axis D in FIG. 1. This would be the case, for example, if the first component 1 is realized as an elongated hollow-cylindrical tube, in which the second component 2 can be longitudinally displaced. If the length of the converter material 10 is shortened in this case, a frictional connection is produced between the friction linings 6 of the active-face elements 4 and 5 and the inner wall 1' of the first component 1 such that a linear transmission of forces can be between the two components. If a purely linear transmission of forces is required between the two components, it would naturally also be possible to choose a cross-sectional shape other than circular, for example, rectangular or n-angular, for the inside contour of the inner wall 1' of the first component, wherein the correspondingly counter-contoured active-face elements 4 and 5 that are on the second component 2 such that they can be rotated or linearly moved in the form of a restricted guidance to produce a frictionally engaged connection to carry out an excursion relative to the aforementioned inner wall of the first component.

The friction lining 6 illustrated in FIG. 1 primarily serves for increasing the frictional forces that can be generated between the friction lining 6 and the inner wall 1' of the first component so as to produce a frictionally engaged connection. The inner wall 1' of the first component 1, as well as the active faces of the active-face elements 4, 5 that can be functionally connected thereto, may be advantageously realized structured or counter-structured referred to the inner wall 1' in order to also produce a form-fitting connection in addition to a frictional connection.

Figure 2:
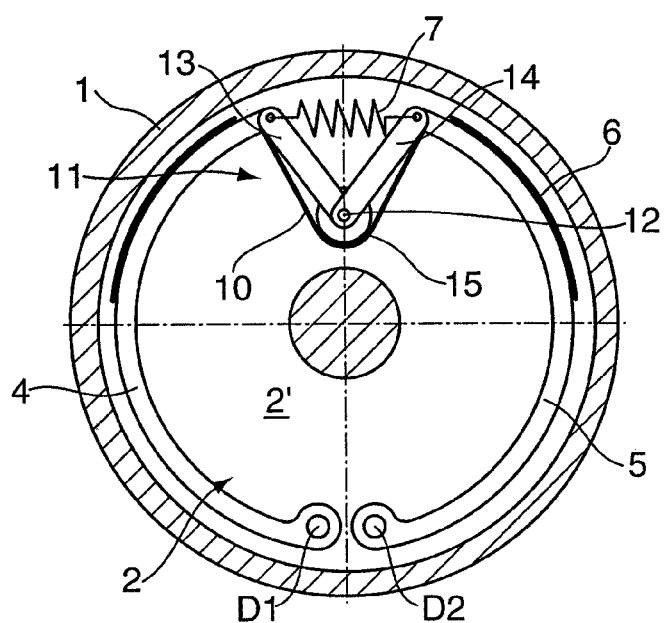
Figure 3:
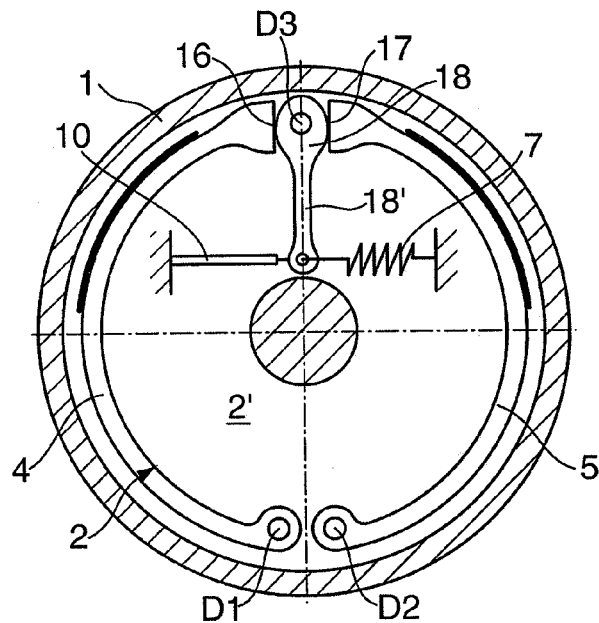
Figure 4:
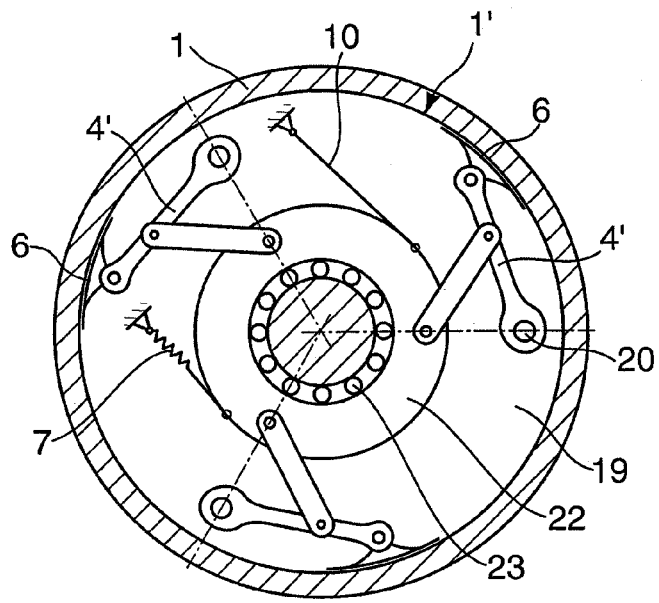

FIGS. 2 to 4 show equivalently acting mechanisms that are based on the same functional principle as the clutch or brake apparatus according to FIG. 1 between a drive shaft and a driven shaft which can be distinguished with respect to their kinematic drive system. Analogous to FIG. 1, the active-face elements 4 and 5 in FIG. 2 are coupled to the second component 2 such that they can be respectively rotated about the axes D1 and D2 independently of one another in the form of a restricted guidance. In this case, a conventional tension spring 7 on the respective ends of the active-face elements 4 and 5 that lie opposite of the axes D1 and D2 also ensures a restoring force directed radially inward and acting between only the active-face elements 4 and 5. In order to spread the active-face elements 4 and 5 radially outward against the inner wall 1' of the first component 1, a toggle lever mechanism 11 with two levers 13 and 14 that can be respectively pivoted relative to one another by means of a pivot joint 12 is additionally provided at the coupling points of the tension spring 7. A deviating link 15 of circular design is furthermore provided on the pivot joint 12, wherein a wire-shaped or strip-shaped converter material 10 that preferably is a SMA material extends over the deviating link and is rigidly connected on both sides to the respective coupling points of the active-face elements 4 and 5. Due to the constructive design of the toggle lever mechanism 11 in connection with the wire-shaped converter material 10 according to the embodiment shown in FIG. 2, the SMA wire 10 is shortened when heated such that the toggle lever 11 is spread apart and the active-face elements 4 and 5 are pressed radially outward against the inner wall 1' of the first component 1. The deviating link 15 allows the utilization of the longest SMA wire possible in order to increase the percentile change of the length of the converter material and therefore ultimately increases the force that is directed radially outward and acts between the active-face elements 4 and 5.

In FIG. 3, the active-face elements 4 and 5, that are connected to the second component 2 analogous to the above-described embodiments, are rotatably coupled to the respective rotational axes D1 and D2 in a restricted guidance. The opposite ends of the active-face elements 4 and 5 respectively feature face sides 16 and 17 that are spaced apart from one another by a gap and produce a sliding functional connection with an oval-shaped cam 18 that can be rotated about a rotational axis D3 located in the intermediate space between the face sides 16 and 17. The cam 18 is connected to a lever arm 18', to one side of which a wire-shaped or strip-shaped converter material 10 is coupled, that is connected to the second component 2 which is an end support. The other side of the lever 18' is connected to a stressing element 7 which is a conventional tension spring that is connected to the second component 2 and the spring characteristic of which is adjusted such that the cam 18 is spaced apart from both face sides 16 and 17 symmetrical to the rotational axis D3 in an initial position. If the converter material 10 is a SMA element, the SMA element is shortened as the temperature increases so that a force, that is directed opposite to the spring force, is generated by the SMA element, which causes the lever arm 18' to extent. This causes the cam 18 to press both face sides 16 and 17 in two opposite directions in accordance with its outside contour such that the active-face elements 4 are 5 are displaced radially outward due to their rotation about the respective rotational axes D1 and D2 and produce a frictionally engaged connection with the inner wall 1' of the first component in the above-described fashion. Once the temperature drops again, the wire-shaped or strip-shaped converter material 10 can be returned to its original shape under the influence of a mechanical stressing force, for example, a spring force, such that it reassumes the neutral position illustrated in FIG. 3.

FIG. 4 shows another variation for producing a frictional or form-fitting connection between a second component 2 that is connected to a drive shaft 3 and the inner wall 1' of a first component 1. As in the above-described embodiments, the second component 2 also features a carrier plate 19 that is connected to the drive shaft 3 in a rotationally rigid fashion, wherein lever-like active-face elements 4' are coupled to the carrier plate such that they are rotatable about a rotational axis 20 and feature friction linings 6 that face the inner wall 1' of the first component 1. In order to subject the friction linings 6 to a radial excursion in the direction of the inner wall 1' of the first component 1, the lever-like active-face elements 4' are about centrally connected to an adjusting lever 21 with the other side being rotatably connected to a second carrier disk 22 that is decoupled from the rotation defined by the shaft 3 and therefore from the carrier disk 19 by a bearing 23. The carrier disk 22 is connected to a conventional tension spring 7 and the wire-shaped or strip-shaped converter material 10 at two coupling points that lie diametrically opposite of one another on its disk periphery. The tension spring and the converter material 10 are coupled to one side of the carrier disk 19 with end supports. The bearing 23 makes it possible to rotate the carrier disk 22 relative to the carrier disk 19. If the first and the second components are in the decoupled state, the forces engaging on the carrier plate 22 by means of the converter material 10 and the tension spring 7 are adjusted in a balanced manner so that the friction linings 6 are spaced apart from the inner wall 1' of the first component 1. However, once a certain limit temperature is exceeded, the length of the converter material 10 is reduced such that the carrier disk 22 is turned relative to the carrier disk 19, namely in the counterclockwise direction in the embodiment shown in FIG. 4. This rotation results in an extension of the adjusting lever that is coupled to the carrier disk 22 and ultimately presses the active-face element 4' which is a rod-shaped lever with a friction lining 6 arranged thereon against the inner wall 1' of the first component 1. Once the ambient temperature drops accordingly, it is possible to extend the converter material 10 under the influence of the tension generated by the tension spring 7 such that the carrier plate 22 can be turned back into the initial position illustrated in FIG. 4. According to the embodiments shown, three such active-face elements that can be subjected to a lever-like extension are provided. However, this number may vary and depends on the shape and size of the disk arrangement and the lever arrangement.

Figure 5:
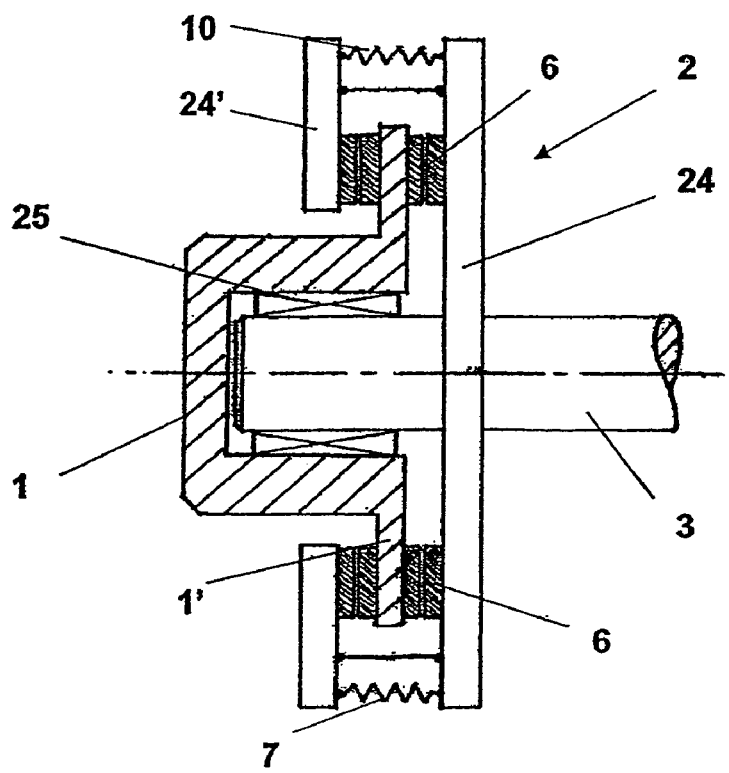
FIGS. 5 to 7 illustrate alternative embodiments of clutch or brake apparatuses that are based on forces or force moments that are directed axially referred to a rotational axis.
Figure 6:
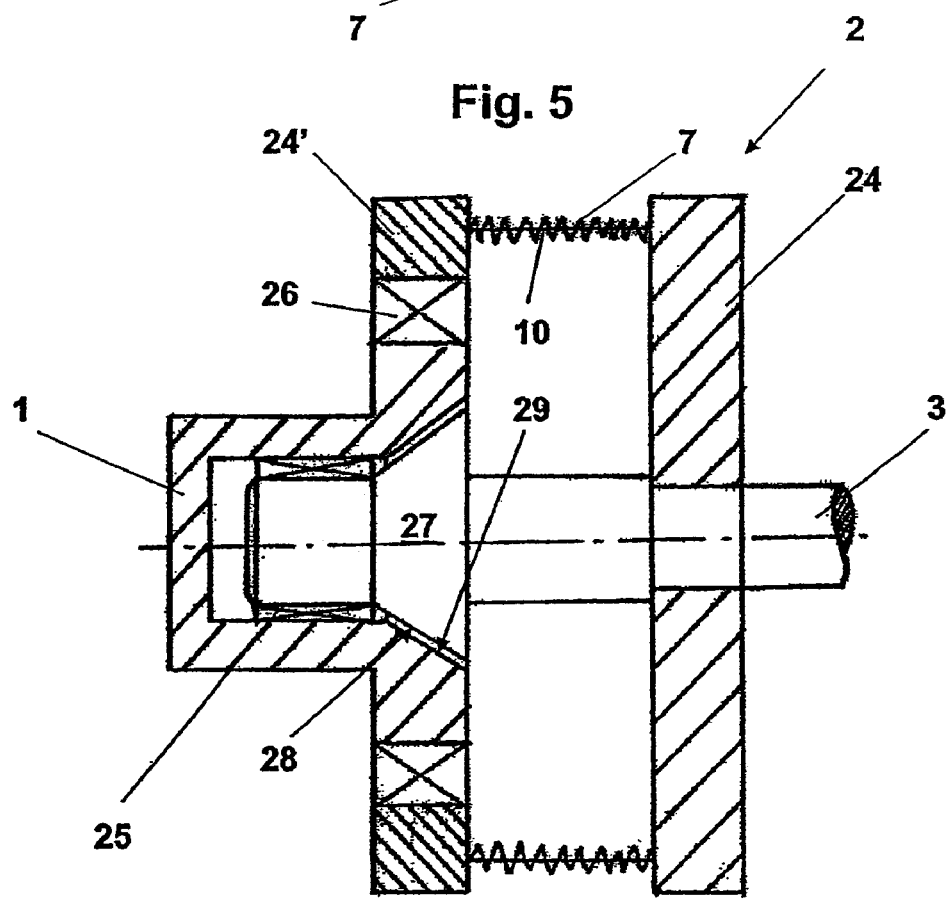
Figure 7:
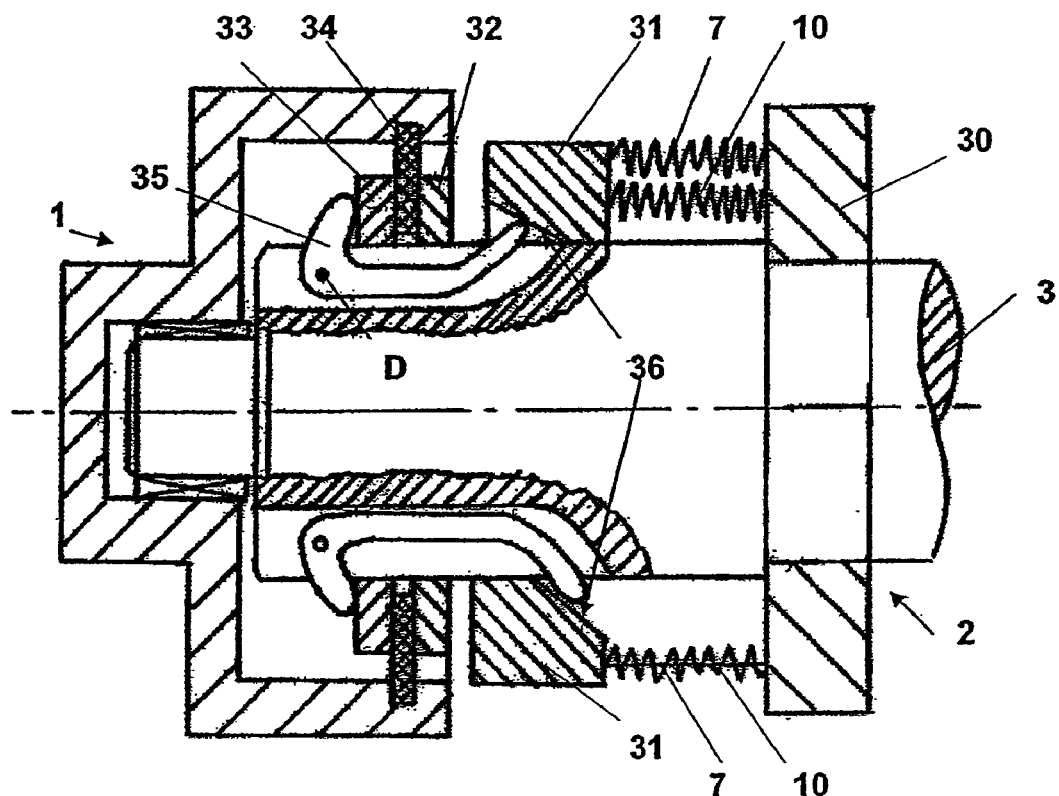

The embodiments illustrated in FIGS. 5, 6 and 7 show clutch or brake apparatuses, in which the forces generated between two components are oriented axially rather than radially (referred to an axis of a rotary drive as above) wherein these clutch or brake apparatuses are also based on the activation of a correspondingly designed converter material as in the previously described embodiments.

The apparatus illustrated in FIG. 5 features a first component 1 that surrounds the face side of a drive shaft 3 similar to a sleeve, wherein the first component 1 is rotationally decoupled from the rotation of the drive shaft 3 by means of a bearing, preferably a needle bearing 25. The second component 2 is connected to the shaft 3 in a rotationally rigid fashion and features a first carrier plate 24, to the peripheral edge of which a second carrier plate 24' is coupled in a rotationally rigid fashion, however, such that it can be axially displaced relative to the first carrier plate 24. A pressure spring 7 and a wire-shaped or strip-shaped converter material 10 are respectively provided between both carrier plates 24 and 24' in order to realize the axial excursion of the second carrier plates 24'. According to the embodiment shown in FIG. 5, the sleeve-like first component 1 features a disk-like widening 1', on which axially opposite sides of friction linings 6 are arranged. The first and the second carrier plates 24 and 24' of the second component 2 also feature surface areas that face the disk-like widening of the first component 1 and also feature friction linings 6 that are able to produce a frictionally engaged connection with the friction linings 6 of the first component 1 if they are subjected to a corresponding axial excursion.

In an initial state, the stressing element 7 which is a conventional pressure spring ensures that the first and the second component are spaced apart such that the corresponding friction linings 6 are not frictionally engaged. However, once a certain limited temperature is exceeded, the length of the wire-shaped or strip-shaped converter material 10 extending between the first carrier plate 24 and the second carrier plate 24' is reduced such that the corresponding friction linings 6 are axially pressed against one another and the first and the second component are rotationally coupled.

FIG. 6 shows another embodiment, in which the first component 1 is connected to a driven element which is not illustrated and is axially seated on the drive shaft 3 such that it is rotationally decoupled by means of a radial bearing 25. The second component 2 is rigidly connected to the drive shaft 3 and features a first carrier plate 24 that is connected to a second carrier plate 24' which is arranged in the first carrier plate 24 in a rotationally rigid fashion by means of a combination of a pressure spring 7 and a converter material 10 that are analogous to the embodiment shown in FIG. 5. The second carrier plate 24' is once again connected to the first component 1 by means of a radial bearing 26, wherein the radial bearing 26 is only able to transmit axially directed forces to the first component 1. In addition, the face side of the drive shaft 3 has a contour 27 that is similar to a truncated cone and features an active face 28 that is directed obliquely to the shaft axis. A corresponding opposite active face 29 is provided on the first component 1 axially opposite of the active face 28 such that a frictionally engaged connection is produced between the shaft drive 3 and the first component 1 when both active faces come in contact with one another. Once a limit temperature for the converter material 10 is exceeded, the converter material contracts such that the second carrier plate 24' is subjected to an axial excursion in the direction of the first carrier plate 24. The radial bearing 26 transmits the axial excursion to the first component 1 with the corresponding opposite active face 29 being pressed against the active face 28 of the contour 27 in the shape of a truncated cone in a force-loaded fashion and causes a certain braking effect. Once the temperature drops below a certain limit temperature that is defined by the converter material, the axial distance between the first and the second carrier plates 24 and 24' increases due to the force generated by the pressure spring 7 such that the active faces 28 and 29 are axially spread apart.

FIG. 7 shows a combined illustration of two apparatuses along a common rotating shaft 3. Both brake or clutch variations which are shown also feature a sleeve-like first component 1 that is axially seated on the drive shaft 3 by means of a radial bearing 25 and, for example, may be connected to a driven element analogous to the above-described embodiments shown in FIGS. 5 and 6. The second component 2 is arranged along the drive shaft 3 and has the following components. A supporting plate 30 that is connected to the shaft 3 in a rotationally rigid fashion, a sliding ring 31 that is arranged along the drive shaft 3 in a rotationally rigid, but in an axially displaceable fashion, a stressing element which is a conventional tension spring 7 that is provided between the sliding ring 31 and the supporting plate 30, as well as a wire-shaped or strip-shaped converter material 10 that is also provided between these components, a first friction element 32 that radially protrudes from the drive shaft 3 and is connected to the drive shaft 3 in a rotationally and axially rigid fashion, as well as a second friction element 33 that is arranged on the drive shaft 3 in a rotationally rigid, but axially in displaceable fashion, wherein both friction elements 32 are 33 are axially spaced apart from one another and enclose an intermediate space, into which a third friction element 34 that is rigidly connected to the first component 1 protrudes from the side of the first component. The second friction element 33, which can be axially displaced relative to the drive shaft 3, produces a functional connection with a toggle lever 35 that can be pivoted about a pivoting axis D and is connected to the drive shaft 3. An extension of the toggle lever 35 about the pivoting axis D occurs when the toggle lever 35 comes in contact with a sliding ring surface 36 that is directed obliquely to the shaft axis as shown in the upper illustration of FIG. 7. In this embodiment, the converter material is coiled in a spiral-like fashion and is able to deform in such a way when a certain limit temperature is exceeded that the spiral of the converter material is elongated along its spiral axis. In the upper variation of FIG. 7, an axial displacement of the sliding ring 31 in the direction of the first component 1 occurs such that the toggle lever 35 is pivoted about the pivoting axis D in such a way that the second friction element 33 is axially pressed against the third friction element 34 and a corresponding frictionally engaged connection with the axially fixed first friction element 32 is produced. Once the temperature drops below the corresponding limit temperature again, the tension spring 7 ensures that the toggle lever 35 is correspondingly reset such that the intermediate space enclosed between the first and the second friction elements is increased and the third friction element 34 is released to run freely.

In contrast to the upper variation illustrated in FIG. 7, the lower variation features a sliding ring 31, with a sliding ring surface 36 directed and arranged such that an axial excursion of the sliding ring 31 toward the first component 1 causes the toggle lever 35 to pivot so that the intermediate space between the first and the second friction element 32 and 33 is increased and the braking effect is terminated. To this and, a wire-shaped or strip-shaped converter material 10 is provided between the supporting plate 30 and the sliding ring 31 and shortened when heated as in the above-described embodiments. In order to return the sliding ring 31 into an axial initial position once the temperature drops below the corresponding limit temperature again, a conventional pressure spring 7 is provided between the supporting plate 30 that is connected to the drive shaft 3 in a rotationally rigid fashion and to the sliding ring 31.

Figure 8:
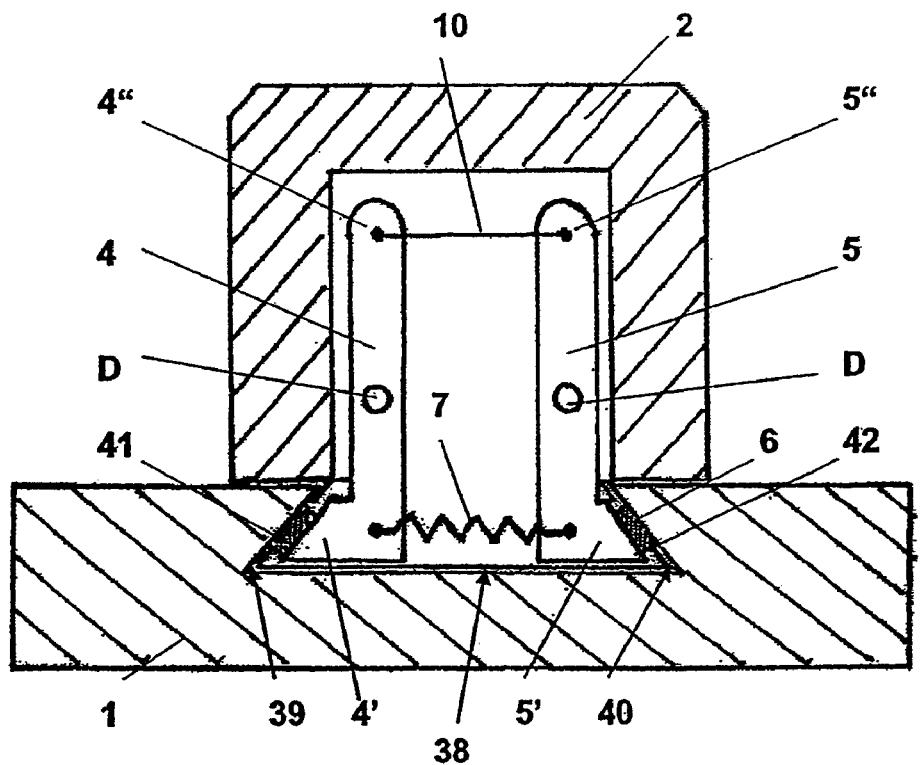
FIG. 8 illustrates a brake or clutch apparatus between two components that can be moved linearly to one another.

The embodiments described so far primarily serve for transmitting forces or force moments between two components that are arranged such that they can be rotated relative to one another. The embodiment according to FIG. 8, in contrast, serves for transmitting forces or force moments between two components that are arranged such that they can be linearly moved relative to one another. For this purpose, the first component 1 that serves, for example, as the driven element and is preferably connected to a stationary part features a groove-shaped recess 38 in its surface. The recess 38 has a dovetail-shaped cross section with two opposing lateral flanks 39 and 40 which are respectively directed obliquely to one another in the embodiment shown in FIG. 8. Although the recess does not necessarily have to be a dovetail, at least one lateral flank that defines the recess 38 should be an undercut in order to generate a corresponding clamping force toward the second component 2 as described below.

A second component is arranged such that it can be linearly moved relative to the first component 1 and is connected, for example, to a drive which is not illustrated. The second component 2 is sleeve-like and features two lever-like active-face elements 4 and 5 in its interior that can be pivoted about a rotational axis D and feature an active-face element end 4' and 5' that protrudes over the second component 2. The active-face element ends 4' and 5' that protrude over the second component 2 engage into the recess 38 and feature active faces 41 and 42 that are arranged opposite of the active faces 39 and 40 and respectively carry a friction lining 6. A conventional tension spring 7 is also connected to the active-face element ends 4' and 5' and is able to pull together both active-face element ends 4' and 5' relative to the rotational axis D such that the active faces 41 and 42 with the friction linings 6 situated thereon are spaced apart from the opposite lateral flanks 39 and 40. A converter material 10 made of SMA material extends between the active-face element ends 4" and 5" that lie opposite of the active-face element ends 4' and 5' and is able to contract as the temperature increases. Due to the lever effect and the ability to rotate the individual active-face elements 4 and 5 about the corresponding rotational axes D, the active faces 41 and 42 with the friction linings 6 arranged thereon are pressed against the lateral flanks 39 and 40 in a force-loaded fashion which, in this case, is such that the first and the second components can be locked relative to one another.

Figures 9A, 9B:
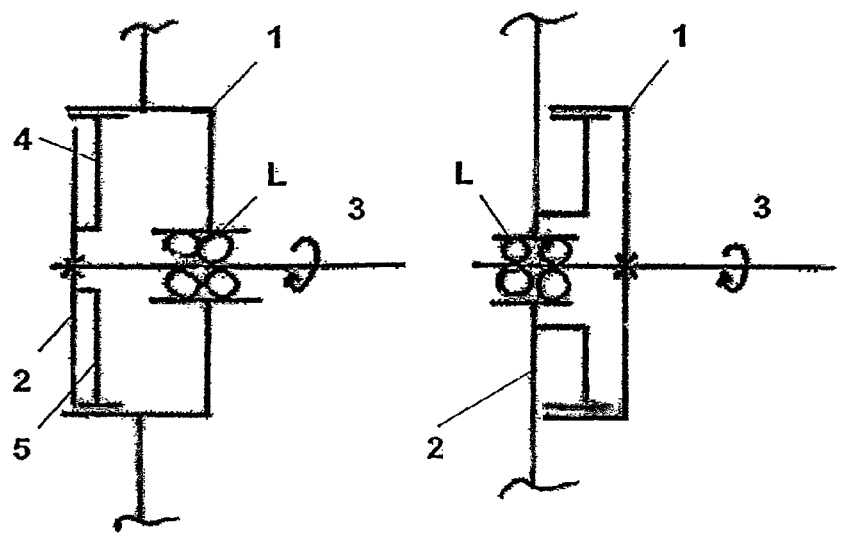
FIGS. 9a and b are schematic representations for elucidating two applications with respect to the drive segment and the driven segment.

The above-described embodiments respectively feature a first and a second component that can be respectively connected to either a drive element or a driven element. The embodiments shown in FIGS. 9a and b indicate that the inventive apparatus can be flexibly utilized. For example, FIG. 9a shows that the first component 1 that is usually realized as a drum housing is connected to a driven element and guided such that it can be rotated relative to a drive shaft 3 by means of a corresponding bearing L. The second component 2 is realized as a carrier plate and is connected to the shaft drive 3 in a rotationally rigid fashion. Active-face elements 4 and 5 coupled to the second component and can be displaced radially relative to the shaft 3 against the inner wall of the drum-shaped first component and therefore transmit radially acting forces or force moments to the first component.

It is also possible to connect the first component 1 to a shaft drive 3 in a rotationally rigid fashion as shown in FIG. 9b and to decouple the second component 2 from the rotational movement of the shaft drive 3 by means of a bearing L. The second component 2 is connected to the driven element in this case.

Due to the inventive apparatus that may be realized in the form of a clutch or a brake depending on the intended use, no regulated or controlled energy supply, for example, in the form of mechanical, electrical, hydraulic or pneumatic energy other than heat that can be generated by a process, for example, in the form of the waste heat of an engine to be cooled, is required for the actuation or engagement of the apparatus if an SMA converter material is used. Consequently, it is possible to realize, in particular, temperature-dependent engagements between linearly moved or rotating parts in a simple and compact fashion that causes little wear and requires little maintenance, wherein no energy other than the heat triggering the engagement needs to be supplied. The engagement is reversible, that is, it is reversed again as soon as the temperature drops below a certain value without an external energy supply.

LIST OF REFERENCE SYMBOLS

1 First component
1' Inner wall
2 Second component
3 Shaft, shaft drive
4, 5 Active-face element 4', 5'; 4", 5" Active-face element end
6 Friction lining
7 Stressing element in the form of a tension or pressure spring
8, 9 Web-like extension
10 Converter material
11 Toggle lever
12 Pivot joint
13, 14 Lever
15 Guide link
16, 17 Face side
18 Cam
18' Lever arm
19 First carrier disk
20 Pivoting axis
21 Connecting lever
22 Second carrier disk
23 Bearing
24, 24' First, second carrier plate
25 Radial bearing
26 Radial bearing
27 Truncated cone contour
28 Active face
29 Opposite active face
30 Supporting plate
31 Sliding ring
32 First friction element
33 Second friction element
34 Third friction element
35 Toggle lever
36 Sliding ring surface
37 N/A
38 Recess
39, 40 Lateral flank
D, D1, D2, D3 Rotational axis
L Bearing

The invention claimed is:

1. An apparatus for producing a frictional and/or form-fitting connection between components which are movable linearly or rotated relative to one another for transmitting forces and/or force moments that act between the components in a linear and/or rotational manner, wherein the first component surrounds the second component with at least one inner wall facing the second component, wherein:

the second component includes elongated active face elements which are pivotable about a common rotational axis or about separate rotational axes that are parallel to one another in a region of one of the active-face elements and are moved in response to a force from a first position, in which the active-face elements are spaced apart from an inner wall, into a second position, in which the active-face elements produce the frictional and/or form-fitting connection with the inner wall, at least one mechanical stressing element connected to the active-face elements and exerting a restoring force acting between the active-face elements and holding the active-face elements in the first position, a kinematic system acting upon the active-face elements to provide a force opposite to the restoring force which is driven exclusively by a converter material, and wherein the kinematic system is connected to the active-face elements at ends of the active-face elements and transfers the active-face elements into the second position; and wherein the kinematic system comprises a toggle lever that is connected to the active-face element ends and on which a wire or strip of converter material extends, wherein the converter material is coupled to the active-face element ends and changes shape upon being supplied with energy, so that the toggle lever opens into a spread position and the active-face elements are transferred into the second position.

2. An apparatus for producing a frictional and/or form-fitting connection between components which are movable linearly or rotated relative to one another for transmitting forces and/or force moments that act between the components in a linear and/or rotational manner, wherein the first component surrounds the second component with at least one inner wall facing the second component, wherein:

the second component includes elongated active face elements which are pivotable about a common rotational axis or about separate rotational axes that are parallel to one another in a region of one of the active-face elements and are moved in response to a force from a first position, in which the active-face elements are spaced apart from an inner wall, into a second position, in which the active-face elements produce the frictional and/or form-fitting connection with the inner wall, at least one mechanical stressing element connected to the active-face elements and exerting a restoring force acting between the active-face elements and holding the active-face elements in the first position, a kinematic system acting upon the active-face elements to provide a force opposite to the restoring force which is driven exclusively by a converter material, and wherein the kinematic system is connected to the active-face elements at ends of the active-face element and transfers the active-face element into the second position; and wherein an extension disposed on one active-face element and extending in a direction toward another active-face element; and a wire or strip of converter material extending between the extensions which changes shape when supplied with energy, so that the extensions and active-face elements move in opposite directions in space to cause the active-face elements to be transferred into the second position.

3. An apparatus for producing a frictional and/or form-fitting connection between components which are movable linearly or rotated relative to one another for transmitting forces and/or force moments that act between the components in a linear and/or rotational manner, wherein the first component surrounds the second component with at least one inner wall facing the second component, wherein:

the second component includes elongated active face elements which are pivotable about a common rotational axis or about separate rotational axes that are parallel to one another in a region of one of the active-face elements and are moved in response to a force from a first position, in which the active-face elements are spaced apart from an inner wall, into a second position, in which the active-face elements produce the frictional and/or form-fitting connection with the inner wall, at least one mechanical stressing element connected to the active-face elements and exerting a restoring force acting between the active-face elements and holding the active-face elements in the first position, a kinematic system acting upon the active-face elements to provide a force opposite to the restoring force which is driven exclusively by a converter material, and wherein the kinematic system is connected to the active-face elements at ends of the active-face elements and transfers the active-face elements into the second position; and wherein the active-face element ends are spaced apart from one another by a gap;

a non-circular contour is rotatable about a rotational axis is disposed within the gap and is contacted by the active-face element ends on opposite sides; and a lever arm, with one part attached to the contour, is coupled to a wire or strip of converter material which is connected to the second component and another part of the lever arm is coupled to a stressing element connected to the second component, and the wire or the strip of converter material changes shape when supplied with energy to cause the contour to rotate to cause a distance between the active-face element ends to increase to transfer the active-face elements into the second position.

4. An apparatus according to claims 1, wherein:
at least one active-face element is coupled to the second component with guided movement.

5. The apparatus according to claims 2, wherein:
at least one active-face element is coupled to the second component with guided movement.

6. The apparatus according to claims 3, wherein:
at least one active-face element is coupled to the second component with guided movement.

7. The apparatus according to claim 1, wherein:
the at least one active-face element moves linearly or rotates about a rotational axis relative to the second component with guided movement.

8. The apparatus according to claim 2, wherein:
the at least one active-face element moves linearly or rotates about a rotational axis relative to the second component with guided movement.

9. The apparatus according to claim 3, wherein:
the at least one active-face element moves linearly or rotates about a rotational axis relative to the second component with guided movement.

10. The apparatus according to claim 1, wherein:
the at least one active-face element includes an active face that is counter-contoured relative to the inner wall so that face contact is produced at least between the active face and the inner wall of the first component.

11. The apparatus according to claim 2, wherein:
the at least one active-face element includes an active face that is counter-contoured relative to the inner wall so that face contact is produced at least between the active face and the inner wall of the first component.

12. The apparatus according to claim 3, wherein:
the at least one active-face element includes an active face that is counter-contoured relative to the inner wall so that face contact is produced at least between the active face and the inner wall of the first component.

* * * * *